(12) United States Patent
Nobuoka et al.

(10) Patent No.: US 10,977,512 B2
(45) Date of Patent: Apr. 13, 2021

(54) ARTICLE RECOGNITION DEVICE

(71) Applicant: TOSHIBA TEC KABUSHIKI KAISHA, Tokyo (JP)

(72) Inventors: Tetsuya Nobuoka, Mishima Shizuoka (JP); Masaaki Yasunaga, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 12 days.

(21) Appl. No.: 16/445,494

(22) Filed: Jun. 19, 2019

(65) Prior Publication Data
US 2020/0050881 A1 Feb. 13, 2020

(30) Foreign Application Priority Data
Aug. 13, 2018 (JP) .............................. JP2018-152222

(51) Int. Cl.
*G06K 9/34* (2006.01)
*G01B 11/02* (2006.01)
*G06K 9/46* (2006.01)

(52) U.S. Cl.
CPC .............. *G06K 9/34* (2013.01); *G01B 11/026* (2013.01); *G06K 9/4604* (2013.01); *G06K 2009/4666* (2013.01)

(58) Field of Classification Search
None
See application file for complete search history.

(56) References Cited

U.S. PATENT DOCUMENTS

| 2012/0004763 | A1* | 1/2012 | Freudelsperger | .... B65G 1/1378 700/224 |
| 2016/0155011 | A1* | 6/2016 | Sulc | .................. G06K 9/00671 382/103 |
| 2016/0379076 | A1 | 12/2016 | Nobuoka et al. | |
| 2018/0005088 | A1* | 1/2018 | Farfade | ................ G06K 9/6224 |
| 2019/0130655 | A1* | 5/2019 | Gupta | ................ H04N 21/4126 |

FOREIGN PATENT DOCUMENTS

WO 2013/084731 6/2013

OTHER PUBLICATIONS

Extended European Search Report for European Patent Application No. 19189743.8 dated Jan. 17, 2020.

* cited by examiner

*Primary Examiner* — David Perlman
(74) *Attorney, Agent, or Firm* — Amin, Turocy & Watson, LLP

(57) ABSTRACT

According to one embodiment, an article recognition device includes a storage unit, an image interface, a distance information interface, and a processor. The storage unit stores outline information indicating an outline of an article. The image interface acquires a captured image. The distance information interface acquires distance information from a distance sensor. The processor recognizes a first article from the captured image, specifies an article area in which the first article appears from the captured image based on the outline information, acquires an article area distance between a surface of the first article and the installation base on which the first article is placed, which appear in the captured image, based on the distance information, and determines whether the first article is disposed overlapping a second article based on the outline information and the article area distance.

19 Claims, 6 Drawing Sheets

ARTICLE RECOGNITION DEVICE

CROSS-REFERENCE TO RELATED APPLICATION

This application is based upon and claims the benefit of priority from Japanese Patent Application No. 2018-152222, filed in Aug. 13, 2018, the entire contents of which are incorporated herein by reference.

FIELD

Embodiments described herein relate generally to an article recognition device and an article recognition method.

BACKGROUND

Among article recognition devices, there is a device which captures an image of an installation base on which an article is installed and recognizes the article based on a captured image. Such an article recognition device captures an image of the article of the installation base from one side and acquires the image.

Therefore, in the related arts, the article recognition device has a problem that it cannot be determined whether the articles are arranged in an overlapping manner.

DETAILED DESCRIPTION

Embodiments provide an article recognition device which can determine whether articles are arranged in an overlapping manner is provided.

In general, according to one embodiment, an article recognition device includes a storage unit, an image interface, a distance information interface, and a processor. The storage unit stores outline information indicating an outline of an article. The image interface acquires a captured image. The distance information interface acquires distance information from a distance sensor. The processor recognizes a first article from the captured image, specifies an article area in which the first article appears from the captured image based on the outline information, acquires an article area distance between a surface of the first article and the installation base on which the first article is placed, which appear in the captured image, based on the distance information, and determines whether the first article is disposed overlapping a second article based on the outline information and the article area distance.

Hereinafter, an embodiment will be described with reference to the drawings.

An article recognition device according to the embodiment recognizes an article. The article recognition device captures an image of articles which are set thereon. The article recognition device recognizes the articles from the captured image. For example, the article recognition device recognizes articles based on feature points or the likes extracted from the captured image.

For example, the article recognition device is installed as a cash register for settling goods. For example, the article recognition device recognizes goods. In addition, the article recognition device settles the recognized article. The article recognition device may be installed as a self-register by which a user performs settlement processing. Further, the article recognition device may be installed as an ordinary cash register by which a shop clerk at a store performs settlement processing.

Also, the article recognition device may be installed as an inspection device which determines whether an article purchased after payment is appropriate.

The application of the article recognition device is not limited to a specific configuration.

Figure 1:
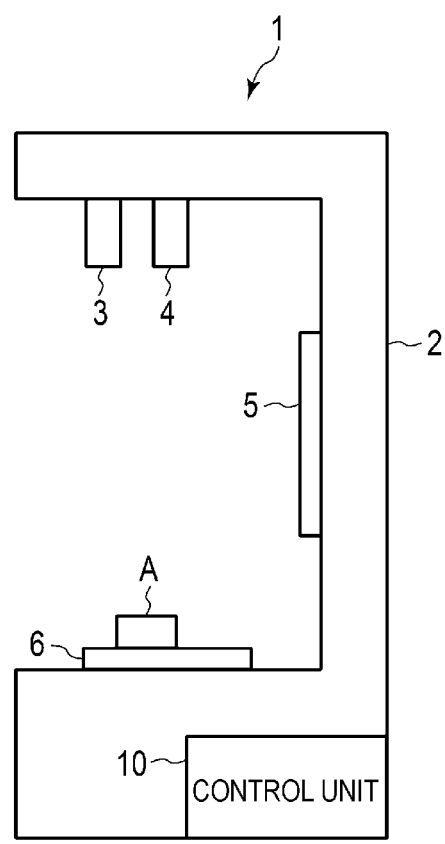
FIG. 1 is a view schematically illustrating a configuration example of an article recognition device according to an embodiment.

FIG. 1 is a block diagram schematically illustrating a configuration example of an article recognition device 1 according to the embodiment. As illustrated in FIG. 1, the article recognition device 1 includes a housing 2, a camera 3, a distance sensor 4, an operation panel 5, an installation base 6, a control unit 10, and the like.

The housing 2 is a frame forming an outline of the article recognition device 1. The housing 2 is formed so that the installation base 6 can be installed thereon. In an example illustrated in FIG. 1, the housing 2 is formed in a U-shape.

The camera 3 is installed on an upper portion of the housing 2 so as to be directed downward. The camera 3 captures an image of an article (for example, an article A) on the installation base 6. That is, the camera 3 is installed so as to capture the image of the article from above. The camera 3 may be installed so as to capture the image of the article from obliquely above. The position and direction in which the camera 3 is installed is not limited to a specific configuration. The camera 3 transmits the captured image to the control unit 10.

The distance sensor 4 is installed on the upper portion of the housing 2 so as to be directed downward. The distance sensor 4 measures a distance between the article installed on the installation base 6 and the distance sensor 4 or a distance from the article to a plane horizontal to the distance sensor 4.

The distance sensor 4 generates distance information indicating a distance from a predetermined reference plane based on the measurement result. For example, the distance information may indicate coordinates of each point in a predetermined three-dimensional coordinate system. Also, the distance information may indicate a distance to a specific measurement point.

The distance sensor 4 transmits the generated distance information to the control unit 10. Further, based on the measurement result, a processor 11, described below, in the control unit 10 may generate distance information indicating the distance from the predetermined reference plane.

For example, the distance sensor 4 includes a light source and a sensor for detecting reflected light rays of light rays irradiated from the light source. The distance sensor 4 measures a distance based on the reflected light ray of the light ray (visible light ray or invisible light ray) irradiated from the light source. For example, the distance sensor 4 may perform a Time-of-Flight (ToF) method in which the distance to a measurement target object is measured based on the time until the irradiated light ray is reflected by the measurement target object and reaches the distance sensor 4.

The distance sensor 4 may calculate the distance based on the parallax of respective images captured by two cameras (stereo cameras). Further, the distance sensor 4 may measure the distance from distortion of a dot pattern by projecting the dot pattern.

The configuration of the distance sensor 4 is not limited to a specific configuration.

The operation panel 5 is an interface which receives input of an instruction from an operator and displays various kinds of information to the operator. The operation panel 5 is constituted of an operation unit which receives input of an instruction and a display unit which displays information.

As the operation of the operation unit, the operation panel 5 transmits a signal indicating the operation accepted from an operator to the control unit 10. In this case, the operation unit is constituted of a touch panel. Further, the operation unit may further include a keyboard or a numeric keypad.

The operation panel 5 displays an image from the control unit 10 as the operation of the display unit. For example, the display unit is constituted of a liquid crystal monitor. The display unit is integrally formed with a touch panel as the operation unit.

The installation base 6 is installed in a lower portion of the housing 2. The installation base 6 is a base on which the article is supported. For example, the installation base 6 is formed in a rectangular shape having a predetermined size. Further, the installation base 6 may be provided with a sensor for detecting that the article is placed. The sensor transmits a signal indicating that the article is placed to the processor 11.

The control unit 10 controls the entirety of the article recognition device 1. The control unit 10 recognizes the article installed in the installation base 6 based on an instruction from an operator.

For example, the control unit 10 receives various inputs from an operator through the operation panel 5. Also, the control unit 10 displays various kinds of information to an operator through the operation panel 5.

Figure 2:
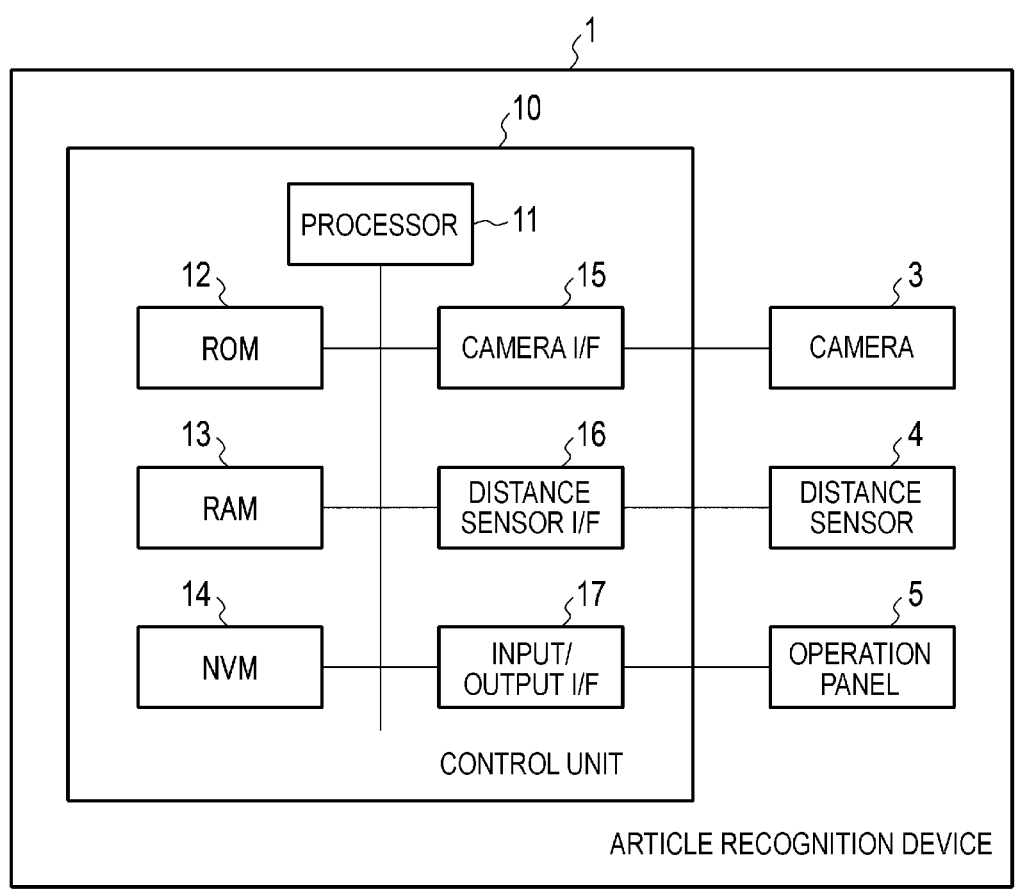
FIG. 2 is a block diagram illustrating a configuration example of the article recognition device.

FIG. 2 is a block diagram illustrating a configuration example of the article recognition device 1. As illustrated in FIG. 2, the article recognition device 1 includes the control unit 10, the camera 3, the distance sensor 4, the operation panel 5, and the like. The control unit 10, the camera 3, the distance sensor 4, and the operation panel 5 are electrically connected. The camera 3, the distance sensor 4, and the operation panel 5 are as described above.

The control unit 10 includes the processor 11, a ROM 12, a RAM 13, an NVM 14, a camera interface 15, a distance sensor interface 16, an input and output interface 17, and the like. The processor 11, the ROM 12, the RAM 13, the NVM 14, the camera interface 15, the distance sensor interface 16, the input and output interface 17 are electrically connected. The camera interface 15 is electrically connected to the camera 3. The distance sensor interface 16 is electrically connected to the distance sensor 4. The input and output interface 17 is electrically connected to the operation panel 5.

The processor 11 controls the overall operation of the control unit 10. That is, the processor 11 controls the operation of the entire article recognition device 1. The processor 11 may be provided with an internal cache and various interfaces. The processor 11 realizes various processes by executing a program stored in the internal cache, the ROM 12, or the NVM 14 in advance.

Further, some of the various functions realized by the processor 11 executing the program may be realized by a hardware circuit. In this case, the processor 11 controls the function executed by the hardware circuit.

The ROM 12 is a nonvolatile memory in which a control program, control data, and the like are stored in advance. The control program and the control data stored in the ROM 12 are incorporated in advance according to the specification of the control unit 10. The ROM 12 stores, for example, a program for controlling a circuit board of the control unit 10 or the like.

The RAM 13 is a volatile memory. The RAM 13 temporarily stores data being processed by the processor 11 and the like. The RAM 13 stores various application programs based on instructions from the processor 11. Further, the RAM 13 may store data necessary for executing the application program, an execution result of the application program, and the like.

The NVM 14 (storage unit) is a nonvolatile memory capable of writing and rewriting data. The NVM 14 is constituted of, for example, a Hard Disk Drive (HDD), a Solid State Drive (SSD), or a flash memory. The NVM 14 stores control programs, applications, various data, and the like according to the operational purpose of the control unit 10.

The NVM 14 stores article information. The article information is information on the article. The article information stores an article code, dictionary information, and outline information in association with one another.

The article code is an identifier indicating an article. For example, the article code is composed of numerical values, character strings, symbols, combinations thereof, or the like.

The dictionary information is information for specifying an article using feature point information (local feature amount). The dictionary information stores feature points and feature amounts of the article image. For example, in the dictionary information, the positions and feature amounts of a plurality of feature points are associated and stored.

The outline information indicates the outline of the article. For example, the outline information indicates the coordinates of the vertex of the article. For example, the outline information indicates a relative positional relationship between the position of the feature point and the outline. Further, the outline information may indicate a relative positional relationship between a position where a code such as a bar code is attached and the outline. Further, the outline information indicates the distance from each surface of the article to the opposite surface.

The camera interface 15 (image interface) is an interface for sending and receiving data to and from the camera. For example, the camera interface 15 transmits a signal instructing image-capturing to the camera 3 based on the control of processor 11. Also, the camera interface 15 acquires a captured image obtained by image-capturing from the camera 3. For example, the camera interface 15 may support a USB connection or may support a connection by the camera link.

The distance sensor interface 16 (distance information interface) is an interface for sending and receiving data with the distance sensor 4. For example, the distance sensor interface 16 transmits a signal which causes the distance sensor 4 to acquire the distance information based on the control of the processor 11. Also, the distance sensor interface 16 obtains the distance information from the distance sensor 4. The distance sensor interface 16 sends the acquired distance information to the processor 11. For example, the distance sensor interface 16 may support a USB connection.

The input and output interface 17 is an interface for sending and receiving data with the operation panel 5. For example, the input and output interface 17 receives a signal indicating an operation received from an operator from the operation panel 5. The input and output interface 17 sends the received signal to the processor 11. Also, the input and output interface 17 sends information indicating a screen to be displayed to an operator to the operation panel 5 based on the control of the processor 11. For example, the input and output interface 17 may support the USB connection or may support the parallel I/F connection.

In addition to the configurations illustrated in FIGS. and 2, the article recognition device 1 may have a configuration according to need or a specific configuration may be excluded from the article recognition device 1.

Figure 3:
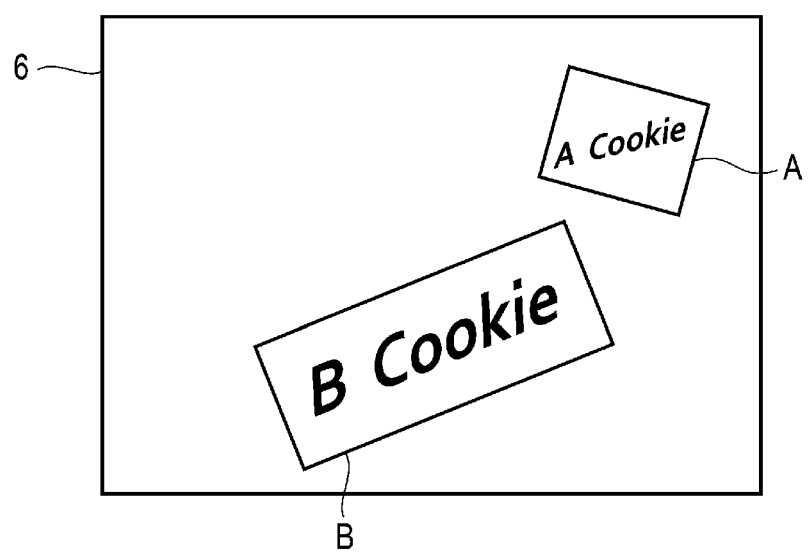
FIG. 3 is a view illustrating an example of an article disposed in the article recognition device.
Figure 4:
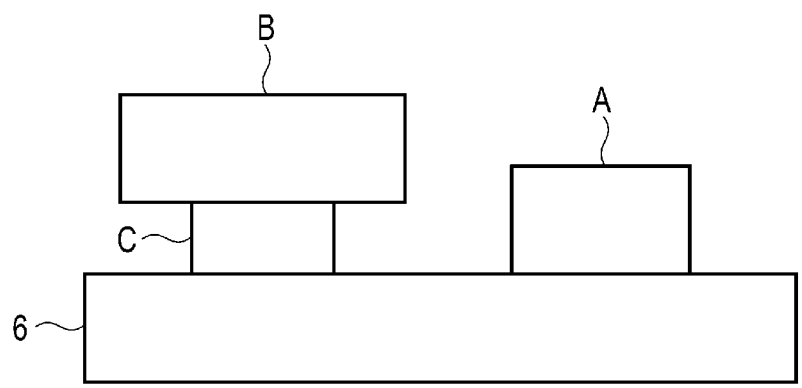
FIG. 4 is a view illustrating an example of the article disposed in the article recognition device.

Next, in the embodiment, an example of an article to be disposed in the installation base 6 will be described. FIG. 3 is a top view of the article installed in the installation base 6. FIG. 4 is a horizontal view of the article installed in the installation base 6.

As illustrated in FIGS. 3 and 4, the article A, an article B, and an article C are placed on the installation base 6. As illustrated in FIG. 4, an article A is installed in the installation base 6 without overlapping with other articles. The article B and the article C are placed in an overlapping manner. In this case, the article B is placed on the article C. As illustrated in FIG. 3, the article C is blocked by the article B and is not recognized from the top.

Also, the article A and the article B are placed in a state where a predetermined surface of the package thereof is directed above.

Next, the function realized by the article recognition device 1 will be described. The function realized by the article recognition device 1 is realized by the processor 11 executing a program stored in the ROM 12, the NVM 14, or the like.

First, the processor 11 has a function of acquiring an image (captured image) obtained by capturing an image of the installation base 6 in which the item is placed.

The processor 11 determines whether to start an article recognition process. For example, the processor 11 detects that an item is placed by a user on the installation base 6. For example, the processor 11 detects that an article is placed on the installation base 6 based on a signal from the installation base 6. Also, the processor 11 may detect that an article is placed on the installation base 6 based on the image from the camera 3. Further, the processor 11 may accept an operation indicating that an article is placed on the installation base 6 by a user.

When detecting that the article is placed, the processor 11 determines to start the article recognition process. When it is determined to start the article recognition process, the processor 11 captures the image including the articles. For example, the processor 11 transmits a signal for image-capturing to the camera 3. The processor 11 acquires the captured image from the camera 3. Further, the processor 11 may set an image-capturing parameter to the camera 3 in order to capture an image.

In addition, the processor 11 may acquire a captured image from an external device.

The processor 11 has a function of recognizing an article (first article) installed in the installation base 6 based on the captured image.

For example, the processor 11 extracts feature point information for recognizing an article from the captured image. That is, the processor 11 extracts feature points from the captured image and calculates a feature amount of each feature point. The feature point information includes information such as feature points (for example, coordinates) and feature amounts for respective feature points.

For example, the feature point is a point at a corner portion of an image or a point uniquely defined in a local region such as an extreme point (maximum point or minimum point) of a second derivative function of an image density. A feature point is indicated by coordinates (x, y) representing a position.

The feature amount is a value calculated from the feature point or an image around the feature point. For example, the feature amount is calculated based on a density pattern in the vicinity of the feature point or the like.

The configuration of feature point information is not limited to a specific configuration.

Figure 5:
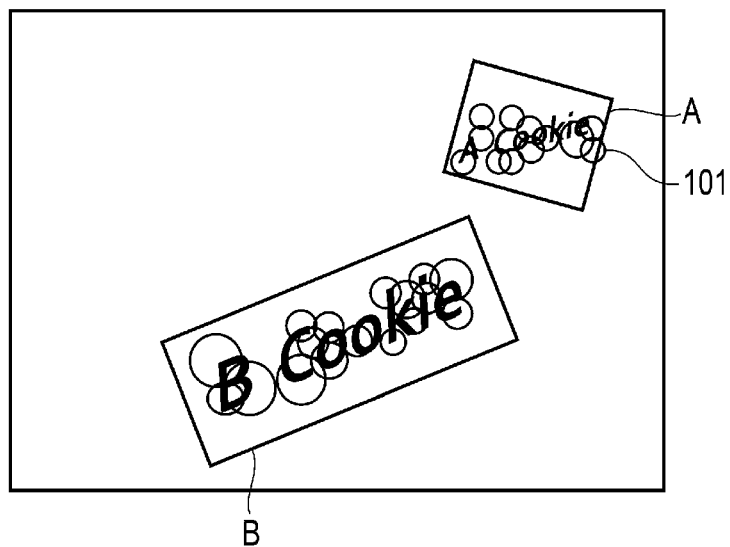
FIG. 5 is a view illustrating an example of feature point information.

FIG. 5 illustrates an example of the feature point information extracted by the processor 11 from a captured image. In FIG. 5, a circle 101 indicates a feature point. Further, the size of the circle 101 indicates a feature amount. As illustrated in FIG. 5, the processor 11 extracts a plurality of circles 101. The Processor 11 extracts a plurality of circles 101 on the articles A and B.

When the feature point information is extracted, the processor 11 recognizes the article based on the extracted feature point information.

The processor 11 acquires one piece of article information from the NVM 14. When the article information is acquired, the processor 11 calculates a similarity ratio R between the dictionary information of the article information and the extracted feature point information.

The processor 11 calculates the similarity ratio R for the dictionary information of article information stored in the NVM 14. When the similarity ratio R of each article information is calculated, the processor 11 specifies a highest similarity ratio Rmax among the similarity ratios R. When the similarity ratio Rmax is specified, the processor 11 determines whether the similarity ratio Rmax exceeds a threshold Rthr. When determining that the similarity ratio Rmax exceeds the threshold Rthr, the processor 11 recognizes an article corresponding to the article information of the similarity ratio Rmax. For example, the processor 11 acquires an article code of the article.

The processor 11 repeats the above operation to recognize the article from the captured image until the similarity ratio Rmax becomes equal to or less than the threshold Rthr.

The processor 11 may recognize the article by reading a barcode from the captured image. For example, the processor 11 detects an area where a high frequency component is strong from the captured image to extract a barcode area in which a barcode appears. When the barcode area is specified, the processor 11 decodes the barcode in the barcode area. That is, the processor 11 reads the article code specifying the article from the barcode. The processor 11 recognizes the article from which the article code is read.

Also, the processor 11 may recognize an article from a captured image by object recognition using a texture pattern or the like. In addition, the processor 11 may recognize an article from a captured image by image-recognition technology using deep learning.

The method by which the processor 11 recognizes the article from the captured image is not limited to a specific method.

Further, the processor 11 has a function of specifying an article area in which a recognized article appears from the captured image based on the outline information.

The processor 11 acquires the outline information of the recognized article from the NVM 14. When the outline information is acquired, the processor 11 specifies the article area based on the recognized article position and the outline information. For example, the processor 11 acquires a relative positional relationship between the position of the feature point and the outline from the outline information. When the relative positional relationship between the position of the feature point and the outline is acquired, the processor 11 specifies the article area based on the feature point extracted from the captured image and used for recognition of the article and the relative positional relationship.

The processor 11 performs the similar operation for each of the recognized articles to specify the article area of each article.

When the article is recognized using the barcode, the processor 11 may specify the article area based on the position of the barcode area of the article in the captured image and the outline information. In this case, the outline information may indicate the relative positional relationship between the position of the barcode and the outline.

Further, the processor 11 may specify the article area based on the position of the article recognized using another recognition method and the outline information. In this case, the outline information may indicate the positional relationship between the position of the article recognized in the recognition method and the outline.

Figure 6:
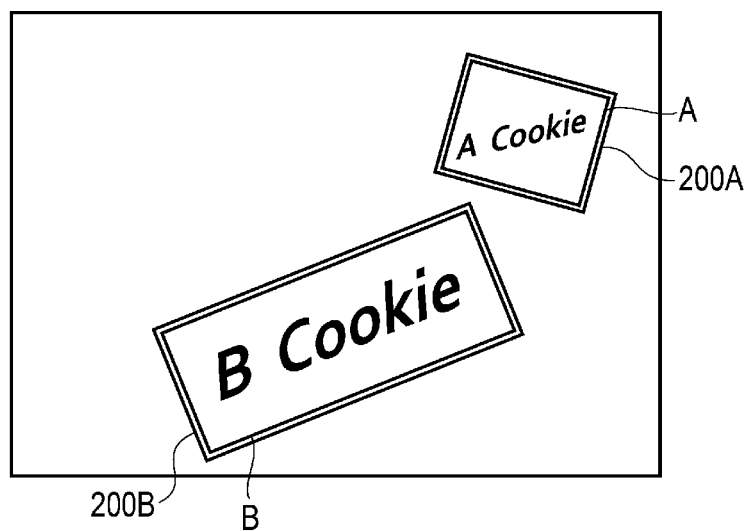
FIG. 6 is a view illustrating an example of an article area.

FIG. 6 indicates an example of an article area specified by the processor 11.

As illustrated in FIG. 6, the processor 11 specifies article areas 200A and 200B.

The article area 200A is an article area in which the article A appears. The article area 200A is specified on the article A.

Further, the article area 200B is an article area in which the article B appears. The article area 200B is specified on the article B.

The processor 11 also has a function of acquiring the height (article area distance) of the specified article area. That is, the processor 11 acquires, as the height of the specified article area, the distance between the surface of the article and the installation base 6 appeared in the article area.

In this case, it is assumed that the processor 11 makes the coordinate values of the captured image and the coordinate values of the distance information correspond to each other. For example, the processor 11 associates the coordinate values based on the position and angle of the camera 3 and the position and angle of the distance sensor 4.

The processor 11 measures the distance (first distance) from a reference plane to the surface appearing on the article area by using the distance sensor 4. For example, the processor 11 measures the distance from the reference plane to the measurement points by setting measurement points in the article area. That is, the processor 11 causes the distance sensor 4 to measure the distance from the reference plane to the measurement point through the distance sensor interface 16.

Figure 7:
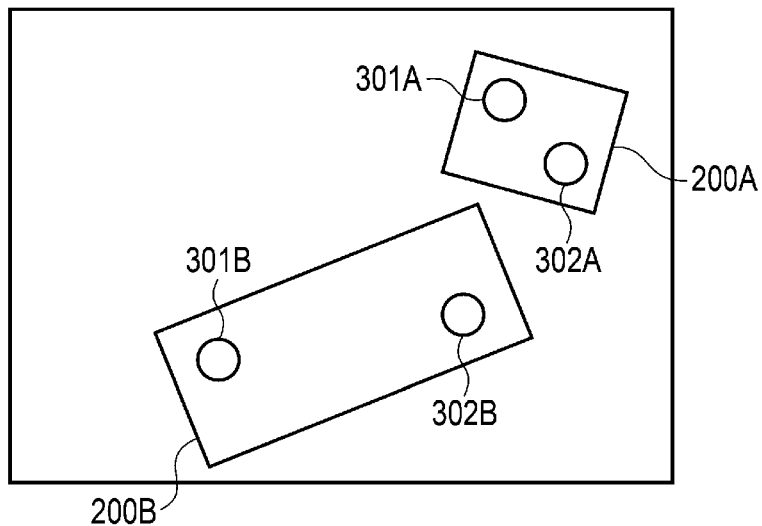
FIG. 7 is a view illustrating an operation example in which the article recognition device measures a distance to the article area.

FIG. 7 illustrates an example of the measurement points set by the processor 11.

As illustrated in FIG. 7, the processor 11 sets measurement points 301A and 302A in the article area 200A.

The measurement point 301A and the measurement point 302A are set near the corners of the article area. Also, the measurement point 301A and the measurement point 302A are set at positions diagonally opposite to each other.

Further, the processor 11 sets measurement points 301B and 302B in the article area 200B.

The measurement point 301B and the measurement point 302B are set near the corners of the article area. Further, the measurement point 301B and the measurement point 302B are set at positions diagonally opposite to each other.

The processor 11 may set one measurement point in the article area or may set three or more measurement points. Also, the processor 11 may determine the number of measurement points according to the size of the article area.

The processor 11 measures the distance from the reference plane to each measurement point. For example, the processor 11 sets the distance obtained by averaging a plurality of measured distances as the distance from the reference plane to the surface appearing in the article area.

When the distance sensor 4 is a stereo camera or the like, the processor 11 may measure the distance from the reference plane in the entirety of the article area. In this case, the processor 11 may set the distance obtained by averaging the distances from the reference plane over the entire area as the distance from the reference plane to the surface appearing in the article area.

When the distance from the reference plane to the surface appearing in the article area is measured, the processor 11 obtains the distance (second distance) from the reference plane to the installation base 6.

The processor 11 may acquire the second distance by using the distance sensor 4. For example, the processor 11 may measure the distance from the reference plane at a measurement point set in an area other than the article area. Further, the NVM 14 may store the second distance in advance. In this case, the processor 11 acquires the second distance from the NVM 14.

When the second distance is acquired, the processor 11 acquires the height of the article area based on the first distance and the second distance. That is, the processor 11 subtracts the first distance from the second distance to obtain the height of the article area.

Figure 8:
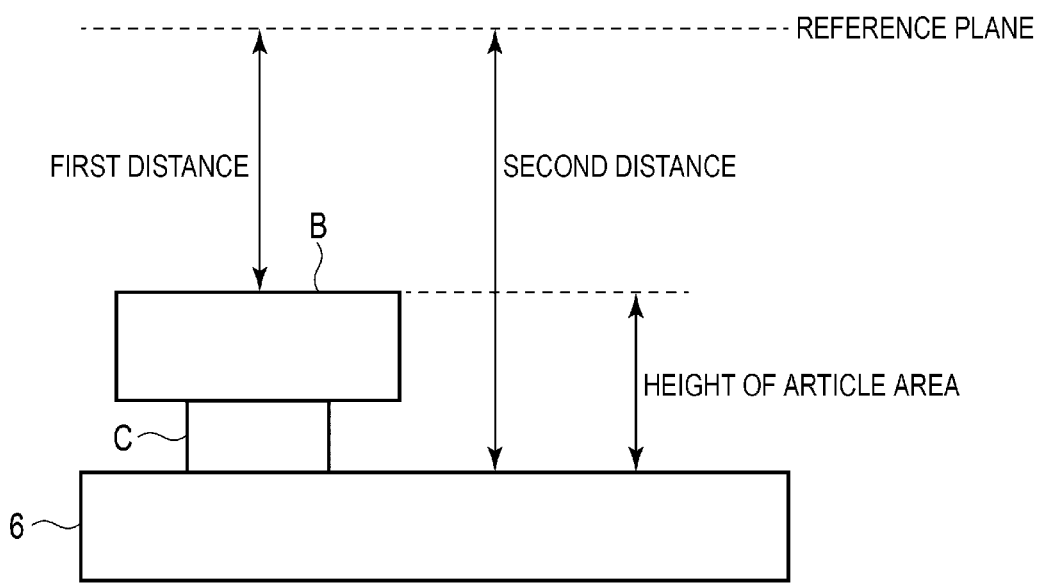
FIG. 8 is a view illustrating an operation example in which the article recognition device measures a height of the article area.

FIG. 8 is a view for explaining an operation example for acquiring the height of the article area. The example illustrated in FIG. 8 shows the operation example for acquiring the height of the article area 200B.

As illustrated in FIG. 8, the article C is placed below the article B. Therefore, the processor 11 acquires a value obtained by adding the height of the article B and the height of the article C as the height of the article area 200B.

The processor 11 has a function of determining whether an article is arranged to overlap on another article (second article) based on the outline information and the height of the article area.

The processor 11 acquires, from the outline information, the distance from the surface in which the article area appears to a surface opposite to the surface. When the distance is acquired, the processor 11 determines whether the distance and the height of the article area match. For example, when the difference between the distance and the height of the article area is equal to or less than a predetermined threshold, the processor 11 determines that the distance and the height of the article area match.

When determining that the distance and the height of the article area match each other, the processor 11 determines that the article is not arranged overlapping the other article. Also, when determining that the distance and the height of the article area do not match, the processor 11 determines that the article is arranged overlapping the other article.

When determining that the article is arranged overlapping the other article, the processor 11 outputs an alert indicating that the article is arranged overlapping the other article. For example, the processor 11 outputs an alert when there are one or more articles determined to be arranged overlapping the other article.

For example, the processor 11 displays an alert on the operation panel 5. Further, the processor 11 may output a warning sound through a speaker or the like. Also, the processor 11 may send an alert to an external device. The alert output by the processor 11 is not limited to a specific configuration.

When determining that the article is not arranged overlapping the other article, the processor 11 outputs information indicating the recognized article. For example, the processor 11 displays the recognized articles on the operation panel 5. Further, the processor 11 may transmit information indicating the recognized article to an external device.

Next, an operation example of the article recognition device 1 will be described.

Figure 9:
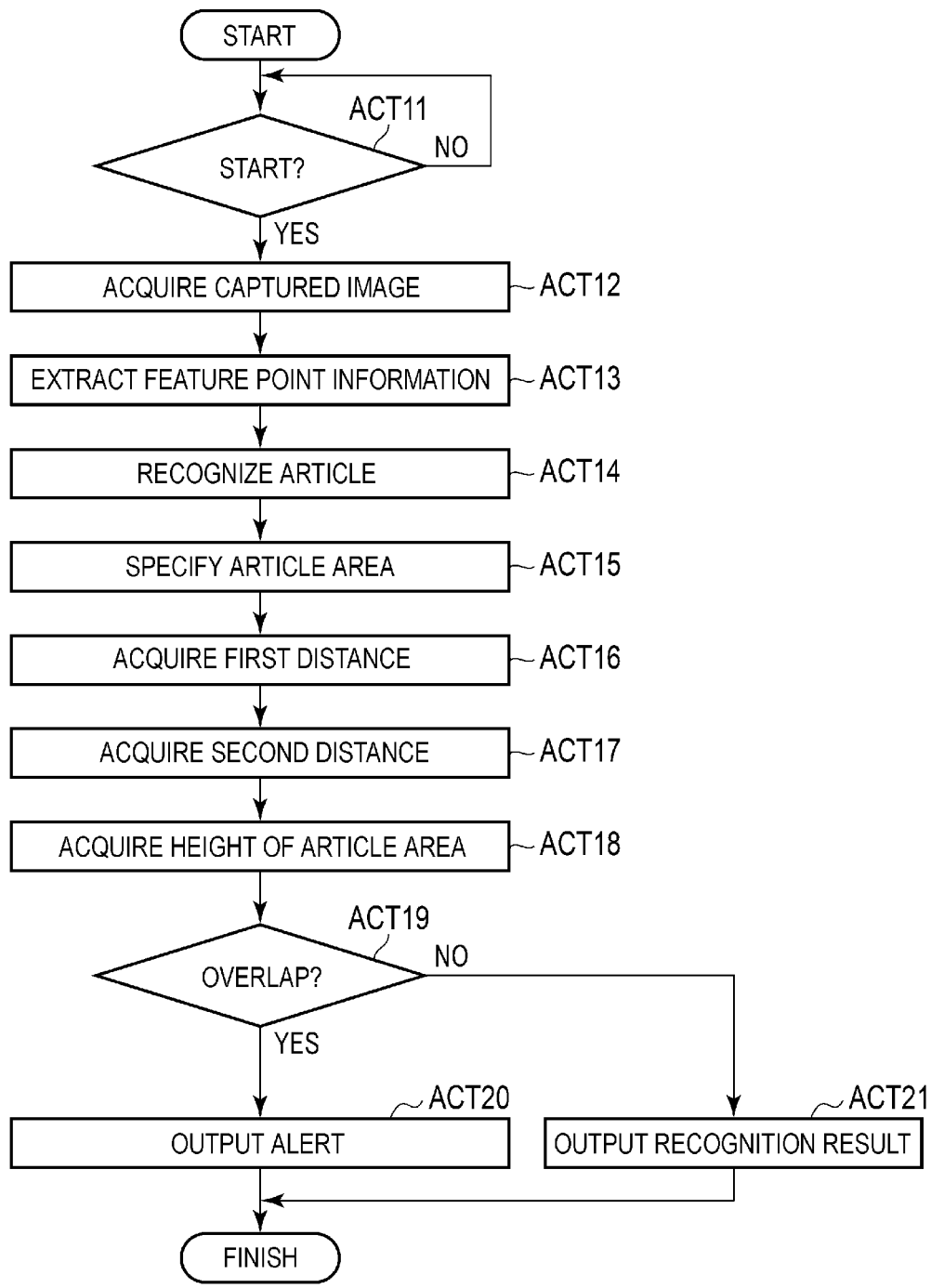
FIG. 9 is a flowchart illustrating an operation example of the article recognition device.

FIG. 9 is a flowchart for explaining an operation example of the article recognition device 1.

First, the processor 11 of the article recognition device 1 determines whether to start the article recognition process (ACT 11). When it is determined that the article recognition process is not to be started (ACT 11, NO), the processor 11 returns to ACT 11.

When it is determined that the article recognition process is to be started (ACT 11, YES), the processor 11 acquires a captured image by using the camera 3 (ACT 12). When the captured image is acquired, the processor 11 extracts feature point information from the captured image (ACT 13).

After the feature point information is extracted, the processor 11 recognizes an article based on the feature point information (ACT 14). When the article is recognized, the processor 11 specifies an article area in which the recognized article appears based on the outline information (ACT 15).

When the article area is specified, the processor 11 acquires the distance (first distance) from the reference plane to the surface appearing in the article area by using the distance sensor 4 (ACT 16). When the distance (first distance) from the reference plane to the surface appearing in the article area is acquired, the processor 11 acquires the distance (second distance) from the reference plane to the installation base 6 (ACT 17).

When the distance (second distance) from the reference plane to the installation base 6 is acquired, the processor 11 acquires the height of the article area based on the first distance and the second distance (ACT 18). When the height of the article area is acquired, the processor 11 determines whether the article overlaps another article based on the outline information and the height of the article area (ACT 19).

When determining that the article overlaps another article (ACT 19, YES), the processor 11 outputs an alert (ACT 20).

When determining that the article does not overlap another article (ACT 19, NO), the processor 11 outputs information indicating the recognized article (ACT 21).

When the alert is output (ACT 20) or when the information indicating the recognized article is output (ACT 21), the processor 11 finishes the operation.

The processor 11 may measure the distance from the reference plane to the article by using the distance sensor 4 and correct the article area based on the measured distance.

For example, after the article is recognized, the processor 11 sets the measurement point at the position (or the average position of the feature point) of the feature point extracted from the captured image and used for the recognition of the article. The processor 11 measures the distance (that is, the distance from the reference plane to the article) from the reference plane to the measurement point by using the distance sensor 4.

When the distance from the reference plane to the measurement point is measured, the processor 11 specifies the size of the article area of the article at the distance from the reference plane based on the measured distance and the outline information. That is, the processor 11 scales the outline indicated by the outline information according to the measured distance. When the size of the article area of the article at the distance from the reference plane is specified, the processor 11 specifies the article area of the size based on the position of the recognized article.

In addition, the article recognition device 1 may be a device in which the article is installed in an installation base formed obliquely to a horizontal direction. In this case, the distance sensor 4 may measure the distance from the reference plane parallel to the installation base on which the articles are arranged.

In addition, the article recognition device 1 may be a device in which an article is placed on a conveyor-like installation base. In this case, the article recognition device 1 may recognize an article moved by the conveyor-like installation.

Also, the article recognition device 1 may settle the recognized article.

The article recognition device configured as described above recognizes the article from the captured image. The article recognition device specifies the article area from the captured image based on the outline information stored in advance. Therefore, the article recognition device can specify the article area without using distance information from the distance sensor. As a result, the article recognition device can avoid that the accuracy of the distance sensor at the edge of the article decreases and the article area cannot be properly specified.

Also, the article recognition device acquires the height of the article area by using the distance sensor. Therefore, the article recognition device can determine whether the recognized article overlaps another article without measuring the distance over the entire installation base.

Thus, the article recognition device can efficiently and effectively determine whether the recognized article overlaps another article.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the gist of the inventions. These embodiments and modifications of the embodiments are included in the scope and the gist of the invention and included in the inventions described in claims and the scope of equivalents of the inventions.

What is claimed is:

1. An article recognition device, comprising:
a memory for storing outline information indicating an outline of an article;
an image interface for acquiring a captured image of the article;
a distance information interface for acquiring distance information from a distance sensor; and
a processor configured to:
recognize a first article from the captured image;
specify an article area in which the first article appears from the captured image based on the outline information, wherein the outline information comprises feature point information, and the feature point information comprises a position of a feature point;
acquire an article area distance between a surface of the first article and an installation base on which the first article is positioned, which appear in the captured image, based on the distance information; and
determine whether the first article overlaps a second article based on the outline information and the article area distance.

2. The device according to claim 1, wherein
the processor is further configured to:
extract the feature point information from the captured image;
recognize the first article based on the feature point information; and
specify the article area based on the position of the feature point of the feature point information.

3. The device according to claim 1, wherein
the processor is further configured to cause the distance sensor to measure a first distance from a reference plane to a measurement point set on the surface of the first article.

4. The device according to claim 3, wherein
the processor is further configured to:
cause the distance sensor to measure a second distance from the reference plane to the installation base; and
acquire the article area distance based on the first distance and the second distance.

5. The device according to claim 1, further comprising:
a camera for generating the captured image.

6. The device according to claim 2, wherein
the feature point is a point at a corner portion of a captured image or a point uniquely defined in a local region such as an extreme point of a second derivative function of an image density and indicated by coordinates (x, y) representing a position.

7. The device according to claim 1, wherein
the outline information indicates coordinates of a vertex of the article.

8. An article recognition method, comprising:
storing outline information indicating an outline of an article;
acquiring a captured image of the article;
acquiring distance information from a distance sensor;
recognizing a first article from the captured image;
specifying an article area in which the first article appears from the captured image based on the outline information, wherein the outline information comprises feature point information, and the feature point information comprises a position of a feature point;
acquiring an article area distance between a surface of the first article and an installation base on which the first article is positioned, which appear in the captured image, based on the distance information; and
determining whether the first article overlaps a second article based on the outline information and the article area distance.

9. The method according to claim 8, further comprising:
extracting the feature point information from the captured image;
recognizing the first article based on the feature point information; and
specifying the article area based on the position of the feature point of the feature point information.

10. The method according to claim 8, further comprising:
measuring a first distance from a reference plane to a measurement point set on the surface of the first article.

11. The method according to claim 10, further comprising:
measuring a second distance from the reference plane to the installation base; and
acquiring the article area distance based on the first distance and the second distance.

12. The method according to claim 8, further comprising:
generating the captured image using a camera.

13. The method according to claim 9, wherein
the feature point is a point at a corner portion of a captured image or a point uniquely defined in a local region such as an extreme point of a second derivative function of an image density and indicated by coordinates (x, y) representing a position.

14. The method according to claim 8, wherein
the outline information indicates the coordinates of a vertex of the article.

15. The method according to claim 8, further comprising:
specifying the article area without using distance information from a distance sensor.

16. A moving article recognition device, comprising:
a memory for storing outline information indicating an outline of a moving article;
an image interface for acquiring a captured image of the moving article;
a distance information interface for acquiring distance information from a distance sensor; and
a processor configured to:
recognize a first moving article from the captured image;
specify an article area in which the first moving article appears from the captured image based on the outline information, wherein the outline information comprises feature point information, and the feature point information comprises a position of a feature point;
acquire an article area distance between a surface of the first moving article and a conveyer-like installation base on which the first moving article is positioned, which appear in the captured image, based on the distance information; and
determine whether the first moving article overlaps a second moving article based on the outline information and the article area distance.

17. The device according to claim 16, wherein
the processor is further configured to:
extract the feature point information from the captured image;
recognize the first moving article based on the feature point information; and
specify the article area based on the position of the feature point of the feature point information.

18. The device according to claim 16, wherein
the processor is further configured to cause the distance sensor to measure a first distance from a reference plane to a measurement point set on the surface of the first moving article.

19. The device according to claim 18, wherein
the processor is further configured to:
cause the distance sensor to measure a second distance from the reference plane to the installation base; and
acquire the article area distance based on the first distance and the second distance.

* * * * *